United States Patent [19]

Deneke et al.

[11] Patent Number: 5,463,189
[45] Date of Patent: Oct. 31, 1995

[54] INSTALLATION CLIP DEVICE FOR ELECTRICAL CABLES

[76] Inventors: Bernard F. Deneke, 7946 S. Madison Way, Littleton, Colo. 80122; James W. Rumbold, 2006 Kelty Rd., Franktown, Colo. 80116; Clark B. Scott, 5016 Tule Lake Dr., Littleton, Colo. 80123

[21] Appl. No.: 173,412

[22] Filed: Dec. 23, 1993

[51] Int. Cl.$^6$ ................................................. H01B 17/00
[52] U.S. Cl. ............................... 174/138 G; 174/72 A; 24/336; 24/555; 248/68.1
[58] Field of Search ................................ 174/138 G, 135, 174/72 A; 24/336, 555, 562; 248/68.1, 72, 73, 74.2; D8/356, 394, 395, 396

[56] References Cited

U.S. PATENT DOCUMENTS

| D. 310,020 | 8/1990 | Fujioka | D8/396 |
|---|---|---|---|
| D. 329,373 | 9/1992 | Kaga | D8/394 |
| 4,437,633 | 3/1984 | André | 248/68.1 |
| 4,881,705 | 11/1989 | Kraus | 248/74.2 |
| 5,090,645 | 2/1992 | Zuercher | 248/68.1 |
| 5,188,318 | 2/1993 | Newcomer et al. | 248/68.1 |
| 5,188,319 | 2/1993 | Hawash et al. | 248/68.1 |

*Primary Examiner*—Kristine L. Kincaid
*Assistant Examiner*—Cheryl R. Figlin
*Attorney, Agent, or Firm*—Timothy J. Martin

[57] ABSTRACT

An installation clip has a base member that fastens to first electrical cable already secured to a structural member in order to mount one or more second electrical cables indirectly to the structural member. A clip structure is disposed on the base member and has a pair of resilient retaining arms that extend outwardly from the base member in opposed, spaced-apart relation to define a clip channel into which the second electrical cable(s) can be placed. Shoulders may be formed on the distal ends of the retaining arms to define an inlet into the clip channel, and lips may be disposed on the shoulders to form a V-shaped opening into the clip channel. The retaining arms may also have opposed central flanges that project into the clip channel parallel to the base member to form upper and lower regions, and a spacer may also be disposed on the base member to separate the lower region into a pair of subregions. These regions are each sized to receive a second electrical cable. The base member is U-shaped and is constructed as lower jaw elements that may be placed between the structural member and the first electrical cable, and an upper jaw which forms a longitudinal base channel with the lower jaw within which the first electrical cable is placed.

28 Claims, 2 Drawing Sheets

INSTALLATION CLIP DEVICE FOR ELECTRICAL CABLES

FIELD OF INVENTION

The present invention broadly relates to clip devices which are mounted to structural members so that electrical cables can be received and retained by the clip devices. More particularly, the present invention is directed to an installation clip device that is adapted to mount directly on a first electrical cable that is mounted along a structural member so that at least a second electrical cable can also be mounted therealong.

BACKGROUND OF THE INVENTION

Since the discovery of electricity, practically all building structures have been wired with electrical cable to provide electric current to outlets, lighting fixtures and a variety of building appliances such as heaters, alarm systems, ventilation systems, etc. For aesthetic purposes, electrical cable is usually installed behind walls, under flooring and above ceilings. Thus, the only visible signs that a building structure is wired for electricity are electrical wall outlets, switches and light fixtures. In the past, electricians would feed electrical cable throughout a partially erected building structures through holes drilled into studs and joists. Generally, electrical cable was strung haphazardly throughout the building structure. Today, local ordinances require that electrical cable, which is to be strung in newly erected building structures, must be organized in groupings of the electrical cable before the erected building could be approved for further construction. Specifically, electrical cable must be affixed substantially along a longitudinal centerline of a structural member such as a wall stud. Local ordinances requiring an organized grouping of electrical cables along the centerline of the structural member has created a demand for various installation clip devices.

One such device is a galvanized metal clip that has an L-shaped mounting structure and a hair-pin clip extending therefrom. The L-shaped mounting structure is nailed to the structural member which, in turn, automatically positions the clip into the center of the structural member. The plurality of electrical cables are gathered and placed within the hair-pin clip and a prong on the free-end portion of the clip is inserted through a hole and is bent to secure the wires along the centerline of the structural member.

Another type of installation clip device is a continuous wire clip device that includes a J-shaped mounting portion and a safety-pin portion. A small leg the J-shaped mounting structure is hammered into the structural member to support the continuous wire clip device thereto and, thus, the safety-pin portion of the continuous wire installation clip device is automatically positioned along a longitudinal centerline of the structural member. Again, the electrical cables are gathered and placed within the safety-pin portion so that the safety-pin portion can be latched closed to secure the electrical cables therein.

Yet another type of installation clip device is one made from molded plastic. A nail-holding structure slidably retains a nail at a 45° angle to the structural member so that it can be pounded thereunto. A stacked array of clip elements are attached to the nail-holding structure as a unitary structure. Each clip element is adapted to laterally receive and retain an electrical cable.

Another plastic installation clip device includes a J-shaped collar portion that loosely grips the structural member. This J-shaped installation clip device is either nailed, glued, or stapled to the structural member. This installation clip device also includes a stacked array of clip elements with each clip element designed to receive and retain an electrical cable.

When only a single electrical cable is to be mounted to the structural member, there is usually no need to install an installation clip device because the single electrical cable is typically stapled longitudinally along the centerline of the structural member. A problem arises when subsequent to the installation of a single electrical cable, a second electrical cable is later required to be installed. Installing multiple electrical cables requires an installation clip device such as one described hereinabove. For ease and simplicity of installing the required clip devices, the originally-installed single electrical cable should be demounted from the structural member so that prior art installation clip devices can be fastened directly to the structural member either by nailing, gluing or stapling the same thereto. Fastening these clip devices has an attendant cost of labor and materials. Furthermore, some of the prior art installation clip devices, particularly the plastic ones, are rather bulky. As a result, only a small number of these clip devices can be carried in an electrician's apron. Alternatively, the electrician may hand-carry a bag or box of the prior art clip devices while moving about the partially erected building structure.

Therefore, a need exists in the industry to provide an installation device for which installation of multiple electrical cables can be done efficiently and effectively. It would be desirable to employ an installation device which does not require direct fastening to the structural member. Further, it would be desirable for an installation clip device which is compact, lightweight, easy to install and not bulky for carrying by the electrician. The present invention is directed to an improved installation clip device.

SUMMARY OF INVENTION

It is an object of the present invention to provide a new and useful installation clip device which is used for mounting multiple electrical cables along a structural member without having to fasten the clip device directly to the structural member.

It is a further object of the present invention to provide an installation clip device which can be easily fastened directly to an electrical cable that is mounted along the structural member.

It is another object of the present invention to provide an installation clip device which is lightweight and compact so that an electrician could carry a plentiful supply thereof.

It is yet another object of the present invention to provide an installation device that can be indirectly fastened to the structural member without using nails, glue or staples.

According to the present invention, an installation clip device is adapted for use with a first electrical cable that is mounted along a structural member so that at least one second electrical cable can be mounted therealong. In its broadest form, the installation clip device includes a base member and a clip structure. The base member is adapted to receive the first electrical cable whereby the base member becomes fastened directly to the first electrical cable thereby indirectly securing it to the structural member. The clip structure is disposed on the base member and is operative to receive and retain at least one additional electrical cable so that this second electrical cable is indirectly secured along the structural member above the first electrical cable.

The clip structure includes a first and a second retaining arm. Each of the retaining arms extends outwardly from the base member and terminates in a respective first and second distal end portion. The base member and the retaining arms are constructed as a unitary piece of resilient material which is preferably acetal plastic. The first and second retaining arms, preferably being symmetrical in configuration, are oriented in opposed, spaced-apart relationship to define a clip channel therebetween. The clip channel is sized and adapted to receive the second electrical cable so that the first and second retaining arms are operative to retain the second electrical cable which is oriented within the clip channel along a clip channel axis thereof.

The first and second retaining arms are movable between a normally closed condition and an opened condition. It is preferable that the retaining arms are resiliently biased into the closed position. In the closed condition, the first and second distal end portions are located proximately to one another. In the opened condition, the first and second distal end portions are separated sufficiently so that the second electrical cable can be inserted into the clip channel. The installation clip device preferably includes a shoulder on each of the first and second distal end portions in an opposed relationship to one another. Each of the first and second distal end portions are then formed as a shoulder so that the shoulders together, being opposed to one another, define an inlet into the clip channel whereby the second electrical cable can be inserted into the clip channel through the inlet.

The installation clip device preferably includes a lip disposed on each shoulder exteriorly of the clip channel in a manner to form a substantially V-shaped opening converging toward the inlet so that the second electrical cable can be pressed into the V-shaped opening. The V-shaped opening facilitates insertion of the second electrical cable into the clip channel and the lips exert a force which operates to spread the first and second retaining arms from the closed condition to the open condition thereby allowing the second electrical cable to pass through and into the clip channel.

Each of the first and second retaining arms has an inner arm surface facing the clip channel and includes a plurality of ridges disposed on the inner arm surfaces and oriented parallel to the clip channel axis, i.e., in the direct that the second electrical cable passes. The first and second retaining arms are sized and configured so that the clip channel can receive a plurality of second electrical cables. Further, each of the first and second retaining arms includes a centrally located flange. Each of the flanges projects into the clip channel in opposed relation to one another to separate the clip channel into a first clip channel region proximate to the base member and a second clip channel region located thereabove. Each of the first and second clip channel regions is sized to receive at least one of the second electrical cable. It is preferable that the installation clip device includes a spacer disposed within the clip channel which is operative to separate the first clip channel region into a pair of subregions whereby each of the subregions is sized to receive one of the second electrical cables. The spacer member has a pair of spacer surfaces facially opposing a respective one of the inner retaining arm surfaces in a substantially parallel relationship therewith.

The base member includes a lower jaw element and an upper jaw element. The lower jaw element is adapted to extend transversely of the first electrical cable between the structural member and the first electrical cable when the base member is fastened thereto. The upper jaw element is spaced from said first jaw element to define a base channel therebetween and is adapted to extend transversely of the first electrical cable when the base member is fastened thereto with the first electrical cable being received in the base channel along a longitudinally extending base channel axis. The lower jaw element terminates in a free edge so that a mouth opening into the base channel is provided between the upper jaw element and the free edge with the mouth opening being located laterally of the base member. It is preferred that the installation clip device include a catch. The catch is disposed on either the first or second jaw element and extends into the base channel. The catch is operative to engage and retain the first electrical cable within the base channel. It is also preferred that the installation clip device include a plurality of teeth which are disposed on another one of the first and second jaw elements and extend into the base channel. One alternative of an installation clip device of the present invention is adapted for use with a first electrical cable that is secured in a longitudinal direction along a structural member so that at least one second electrical cable can be mounted therealong. This alternative installation clip device broadly includes a base member, a first retaining arm and a second retaining arm.

The base member is adapted to be fastened to the first electrical cable and includes a lower jaw element and an upper jaw element. The lower jaw element is adapted to be positioned between the structure member and the first electrical cable when the base member is fastened thereto. The upper jaw element is spaced from the lower jaw element to define a base channel therebetween with the base channel operative to receive the first electrical cable which is oriented along a longitudinally extending base channel axis thereof. The base member may be then fastened to said first electrical cable by the first and second jaw elements.

The first retaining arm projects upwardly from the upper jaw element and terminates in a first free end. The second retaining arm projects upwardly from the upper jaw element in a spaced-apart, opposed relationship to the first retaining arm and terminates in a second free end. The first and second retaining arms form a clip structure that has a clip channel having a clip channel axis extending in the longitudinal direction. The clip channel is sized and adapted to receive at least one second electrical cable such that the first and second retaining arms are operative to retain and position the second electrical cable above the first electrical cable.

The said lower and upper jaw elements are joined at respective first lateral edges thereof so that said base member has a substantially U-shaped configuration with said lower jaw element terminating in a free second lateral edge. A laterally-located, longitudinally-extending mouth opening is formed between said second lateral edge and said upper jaw element so that the base member can be transversely engaged onto the first electrical cable. The mouth opening is convergent in a direction towards the base channel. The alternative installation clip device includes a plurality of longitudinally extending rib teeth disposed on one of said upper and lower jaw elements. The rib teeth project into the base channel.

These and other objects of the present invention will become more readily appreciated and understood from a consideration of the following detailed description of the exemplary embodiment of the present invention when taken together with the accompanying drawings, in which:

DETAILED DESCRIPTION OF THE EXEMPLARY EMBODIMENTS

The present invention generally concerns an installation clip device which is used with a first electrical cable that is mounted along a structural member so that at least a second electrical cable can be mounted therealong. As the description proceeds, one of ordinary skilled in the art would appreciate that the installation clip device of the present invention becomes fastened directly to the first electrical cable and, thereby, is indirectly secured to the structural member. After attachment to the first electrical cable, the installation clip device is operative to receive and retain one or more second electrical cables, whereby these second electrical cables are indirectly secured along the structural member generally parallel to and above the first electrical cable.

Figure 1:
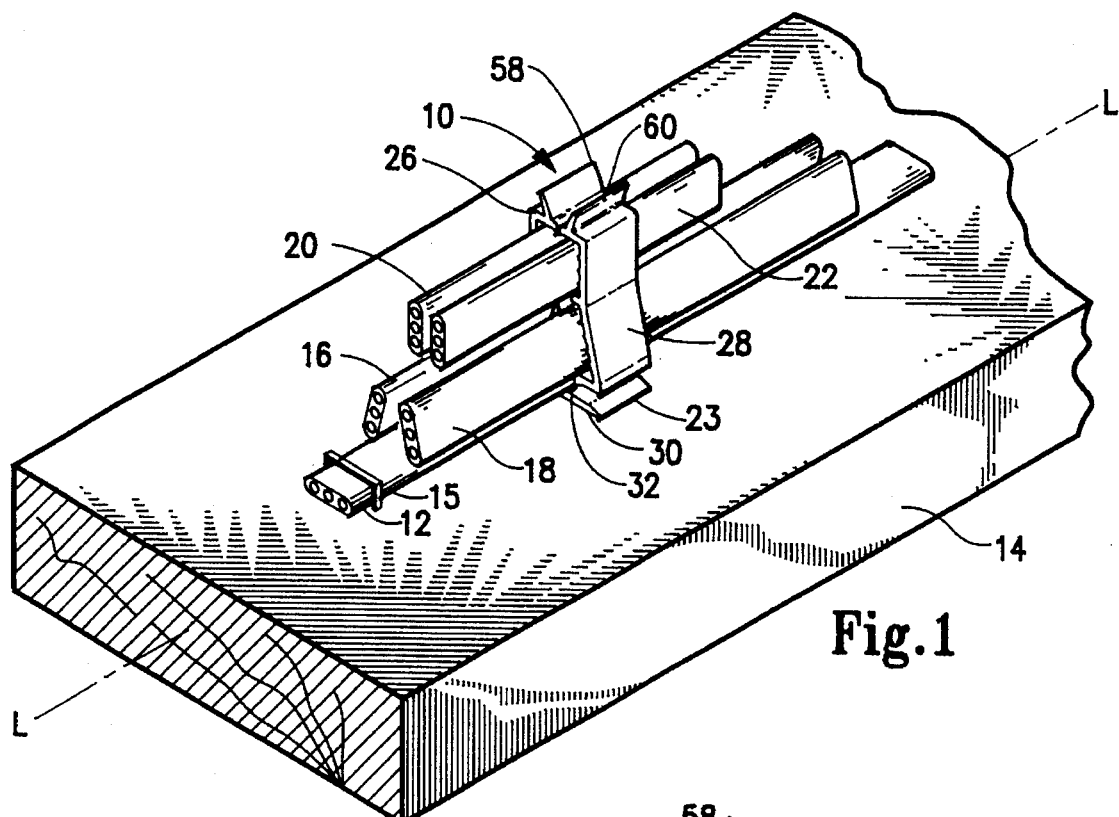
FIG. 1 is a perspective view of a first exemplary embodiment of an installation clip device of the present invention fastened directly to a first electrical cable mounted along a structural member so that it can receive and retain at least
Figures 2, 3:
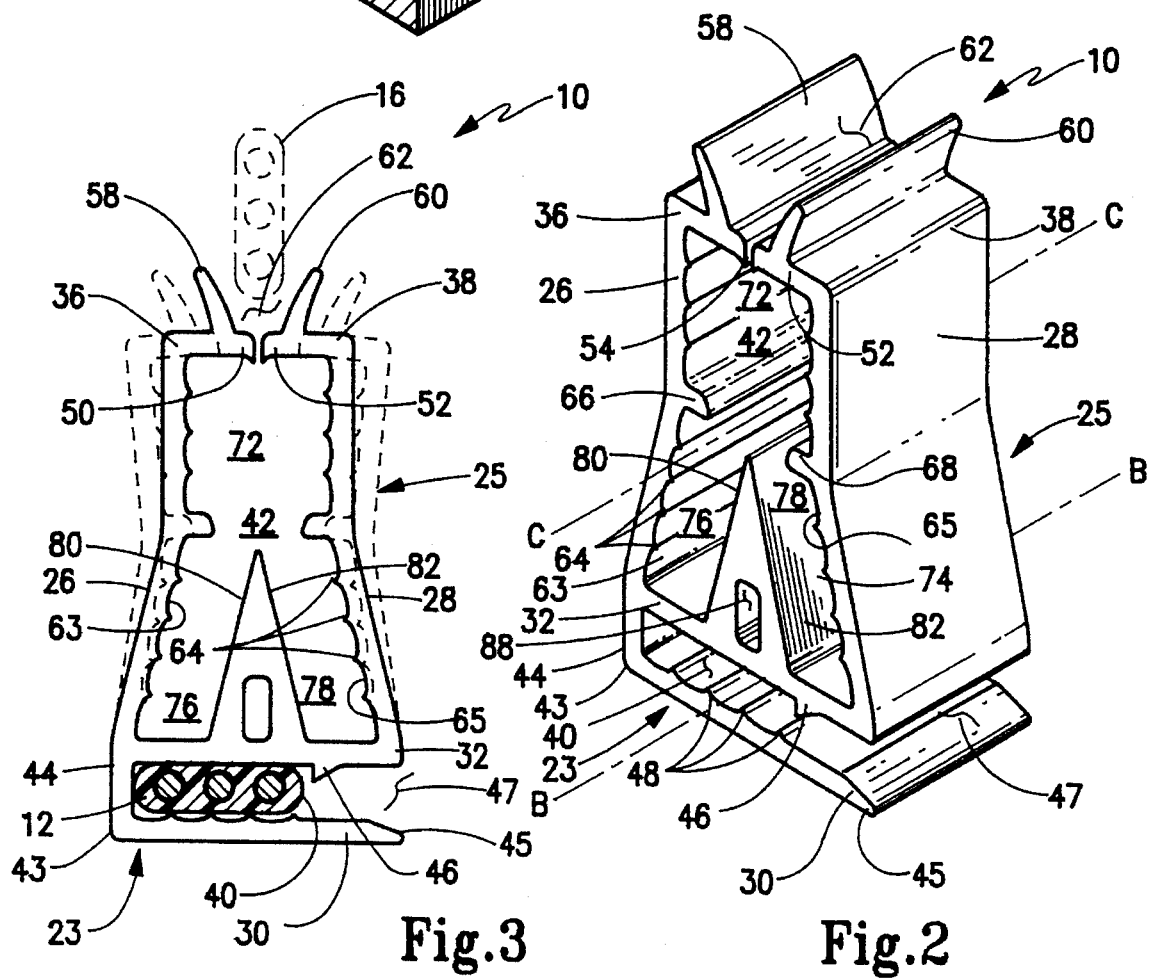
FIG. 2 is a perspective view of the installation clip device shown in FIG. 1.
FIG. 3 is a front elevational view of the installation clip device shown in FIGS. 1 and 2.

As generally introduced in FIGS. 1–3, a first exemplary embodiment of an installation clip device 10 is adapted for use with a first electrical cable 12 that is secured in a longitudinal direction along a structural member 14 by a conventional staple 15 so that at least one second electrical cable can be mounted therealong. As is shown in FIG. 1, however, four such second electrical cables, designated 16, 18, 20 and 22, are received in installation clip device 10. Installation clip device 10 broadly includes a base member 23 and a clip structure 25 here formed by first retaining arm 26 and a second retaining arm 28. Base member 23 has a lower jaw element 30 and an upper jaw element 32. Lower jaw element 30 is adapted to be positioned between structural member 14 and first electrical cable 12 when base member 23 is fastened thereto as best shown in FIG. 1. Upper jaw element 32 is spaced from lower jaw element 30 to define a base channel 40 therebetween. Base channel 40 is operative to receive first electrical cable 12 oriented along a longitudinally extending base channel axis "B" thereof so that the base member 23 may be fastened to first electrical cable 12 by first and second jaw elements 30, 32. Base member 23 and first and second retaining arms 26, 28 are constructed as a unitary piece of resilient material such as acetal or other type of plastic material.

First retaining arm 26 projects upwardly from upper jaw element 32 and terminates in a first free end 36. Second retaining arm 28 projects upwardly from upper jaw element 32 in a spaced-apart, opposed relationship to first retaining arm 26 and terminates in a second free end 38. First and second retaining arms 26, 28 form clip structure 25 having a clip channel 42 that has a clip channel axis "C" extending in a longitudinal direction. Clip channel 42 is sized and adapted to receive at least one of second electrical cables 16, 18, 20 and 22 such that first and second retaining arms 26, 28 are operative to retain and position at least one of second electrical cables 16, 18, 20 and 22 above first electrical cable 12.

Lower and upper jaw elements 30, 32 are joined at respective first lateral edges 43, 44 thereof so that base member 23 has a substantially U-shaped configuration with lower jaw element 30 terminating in a free second lateral edge 45. A laterally-located, longitudinally-extending mouth opening 47 is therefore formed between second lateral edge 45 and upper jaw element 32 so that base member 23 can be transversely engaged onto first electrical cable 12. With reference to FIG. 3, mouth opening 47 is convergent in a direction towards base channel 40 and extends into base channel 40. Base member 23 includes a catch 46 which is disposed on upper jaw element 32 so that it extends into base channel 40. Of course, this catch 46 could be disposed on lower jaw 30 without affecting its operation. Catch 46 is operative to contact and retain first electrical cable 12 within base channel 40 and extends into base channel 40. Base member 23 also includes a plurality of longitudinally extending rib teeth 48 which project into base channel 40 and help grip the first electrical cable 12. Rib teeth 48 are disposed on lower jaw element 30 although rib teeth 48 could be disposed on upper jaw element 32.

Turning again to the construction of clip structure 25, it may be seen that a respective one of each of first and second free ends 36, 38 is formed as a shoulder 50, 52. Shoulders 50, 52 are disposed on respective first and second free ends 36, 38 in an opposed relationship with one another to define an inlet 54 into clip channel 42 so that at least one of second electrical cables 16, 18, 20 and 22 can be inserted into clip channel 42 through inlet 54. First and second retaining arms 26, 28 are movable between a normally closed condition and an opened condition as best shown in FIG. 3. In the normally closed condition, first and second free ends 36, 38 are located proximately to one another. In the opened condition shown in phantom in FIG. 3, first and second free ends 36, 38 are separated sufficiently so that second electrical cable 16 can be inserted into clip channel 42. First and second retaining arms 26, 28 are symmetrical in configuration and are resiliently biased into the closed condition.

Installation clip device 10 also includes a pair of lips 58, 60 which are located at inlet 54 of clip structure 25. Each of lips 58, 60 is disposed on a respective shoulder 50, 52 exteriorly of clip channel 42 in a manner to form a substantially V-shaped opening 62 converging toward inlet 54. V-shaped opening 62 is adapted to receive one or more of second electrical cables 16, 18, 20 and 22 so that one or more of second electrical cables 16, 18, 20 and 22 can be pressed into V-shaped opening 62 thereby causing lips 58, 60 to exert a force operative to spread first and second retaining arms 26, 28 from the closed condition and to the opened condition (drawn in phantom in FIG. 3) thereby allowing one or more of the second electrical cables 16, 18, 20 and 22 to pass through and into clip channel 42.

Each of first and second retaining arms 26, 28 includes an inner arm surface 63, 65 facing clip channel 42 and a plurality of ridges 64 disposed on inner arm surfaces 63, 65. Ridges 64 are oriented parallel to clip channel axis "C". First and second retaining arms 26, 28 are sized and configured so that clip channel 42 can receive a plurality of second electrical cables 16, 18, 20 and 20. To further facilitate receiving a plurality of second electrical cables 16–22, each of first and second retaining arms 26, 28 include a respective centrally located flange 66, 68. Flanges 66, 68 project into clip channel 42 in opposed relation to one another to separate clip channel 42 into a first clip channel region 70 proximate to base member 23 and a second clip channel region 72 located thereabove. Each of first and second clip channel regions 70, 72 is sized to receive at least one of second electrical cables.

Installation clip device also includes a spacer 74 which is disposed within clip channel 42 and is operative to separate first clip channel region 70 into a pair of subregions 76, 78. Each subregion 76, 78 is sized to receive one of second electrical cables 16–22. Spacer 74 has a pair of spacer surfaces 80, 82; each spacer surface 80, 82 facially opposes respective inner arm surface 63, 65 in a substantially parallel relationship therewith. Spacer 74 has an orifice 88 extending therethrough and between spacer surfaces 80, 82. The primary purpose of orifice 88 is to reduce the amount of material needed to fabricate installation clip device 10.

Figure 4:
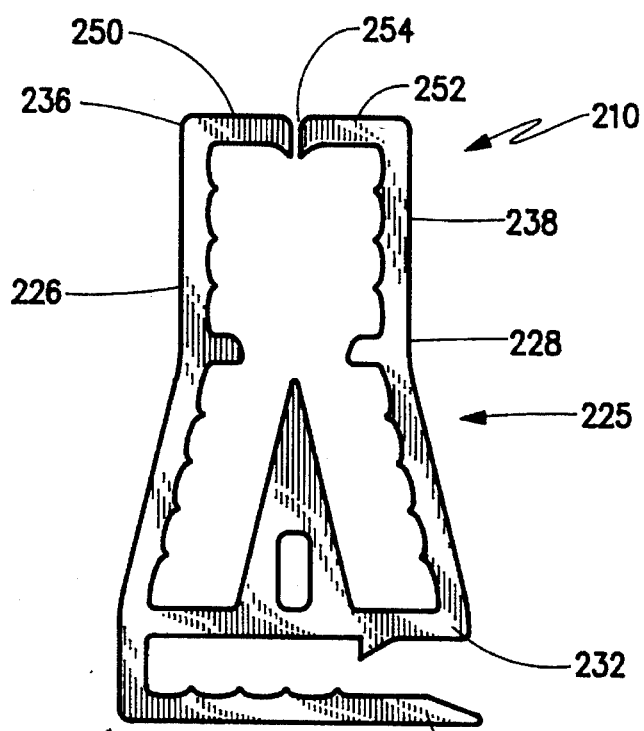
FIG. 4 is a front elevational view of a second exemplary embodiment of an installation clip device of the present invention.

A second exemplary embodiment of an installation clip device 210 is shown in FIG. 4. Installation clip device 210 includes a base member 223 and a clip structure 225 defined by a first retaining arm 226 and a second retaining arm 228. Base member 223 has a lower jaw 230 adapted to transversely abut structural member 14 and an upper jaw 232 operative to cooperate with lower jaw 230 to engage and retain the first electrical cable therebetween. Each of first and second retaining arms 226, 228 has a respective first and second free end 236, 238, each of which is formed as a shoulder 250, 252. Shoulders 250, 252 are operative to define an inlet 254. With the exception of lips 58, 60 described hereinabove, this second exemplary embodiment of installation clip device 210 is identical to the first exemplary embodiment of installation clip device 10.

Figure 5:
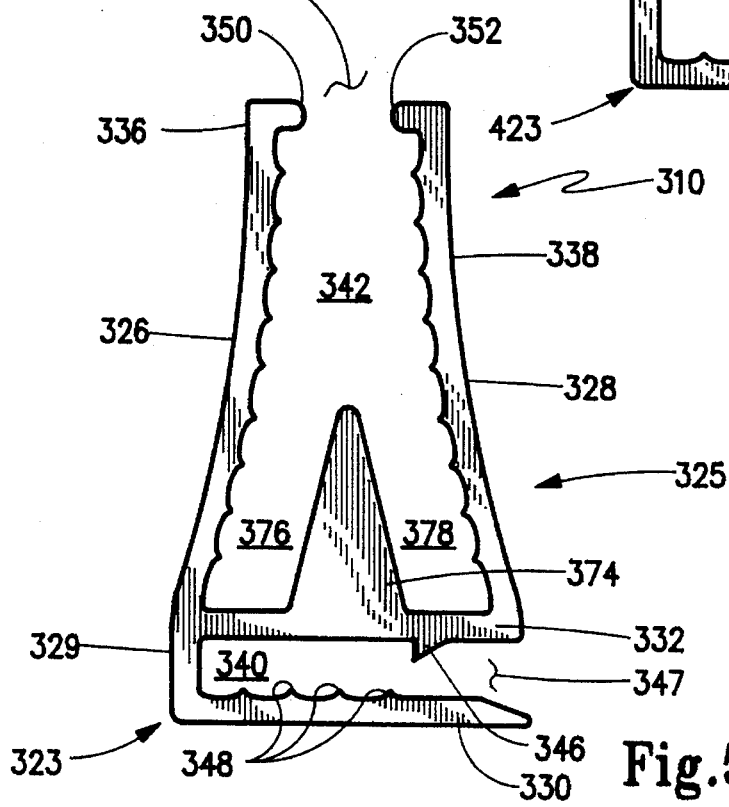
FIG. 5 is a front elevational view of third exemplary embodiment of an installation clip device of the present invention.

A third exemplary embodiment of an installation clip device 310 is shown in FIG. 5. Installation clip device 310 includes a base member 23 and a clip structure 325 defined by a pair of retaining arms 326 and 328. Base member 324 is again adapted to receive the first electrical cable whereby base element 323 becomes fastened directly to the first electrical cable and thereby indirectly secured to the structural member. Clip structure 325 is disposed on base member 323 and is operative to receive and retain the second electrical cable whereby the second electrical cable is indirectly secured along the structural member.

As noted, clip structure 325 includes first and a second retaining arm 326, 328, and each of first and second retaining arms 326, 328 extend outwardly from base member 323 and terminate in a respective first and second distal end portion 336, 338. First and second retaining arms 326, 328 are oriented in opposed spaced-apart relationship to define a clip channel 342 therebetween. Clip channel 340 is sized and adapted to receive the second electrical cable so that first and second retaining arms 326, 328 are operative to retain the second electrical cable oriented within clip channel 342. First and second retaining arms 326, 328 are movable between a normally closed condition and an opened condition. In the normally closed condition, first and second distal end portions 336, 338 are oriented proximately to one another. In the opened condition, first and second distal end portions 336, 338 are separated so that the second electrical cable can be inserted into clip channel 342. Each of first and second distal end portions 336, 338 are formed as a shoulder 350, 352. Shoulders 350, 352 are operative to define an inlet 354 into clip channel 342 to provide access for at least one second electrical cable to be inserted into clip channel 342.

First and second retaining arms 326, 328 include a plurality of ridges 364 which project into clip channel 342 to help grip the second electrical cables. Installation clip device 310 also includes a spacer 374 disposed within clip channel 342 and operative to separate clip channel 342 into a pair of subregions 376 and 378 whereby each of subregions 376 and 378 is sized to receive one second electrical cable.

Base member 323 includes a first and second jaw portions 330 and 332 respectively. First and second jaw portions 330 and 332 are connected to each other at one end and terminate in a respective second end to define mouth opening 447 into a base channel 340 which is formed between first and second jaw portions 330, 332. Base channel 340 is operative to receive the first electrical cable which is mounted onto the structural member. One of first and second leg portions 330, 332 includes a catch 346 extending into base channel 340. Catch 346 extends into base channel 340 and is adapted to engage and retain the first electrical cable within base channel 340. Another one of first and second leg portions 330, 332 includes a plurality of rib teeth 348 which extend into base channel 340.

Figure 6:
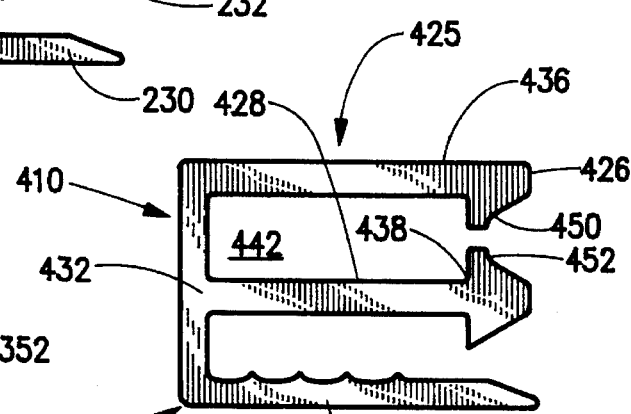
FIG. 6 is a front elevational view of a fourth exemplary embodiment of an installation clip device of the present invention.

A fourth exemplary embodiment of an installation clip device 410 is shown in FIG. 6. Installation clip device 410 includes a base member 423 and a clip structure 425 disposed on base member 423. Base member 423 includes a first and second jaw portions 430 and 432 which are connected to each other at one end to form an L-shape. Clip structure 425 includes a first and a second retaining arm 426, 428. Each of first and second retaining arms 426, 428 extend outwardly from jaw portion 332 and terminate in a respective first and second distal end portions 436, 438. First and second retaining arms 426, 428 are oriented in opposed spaced-apart relationship to define a clip channel 442 therebetween. Each of first and second distal end portions 436, 438 is formed as a shoulder 450, 452.

One of ordinary skilled in the art would appreciate that the installation clip device of the present invention can be used for mounting multiple electrical cables along a structural member without having to fasten it directly to the structural member by using nails, glue or staples. Further, the installation clip device can be fastened directly to an electrical cable that is already mounted along the structural member. Now, once the first electrical cable is mounted onto the structural member, an electrician can simply fasten the installation clip device to the first electrical cable and thereafter add a plurality of second electrical cables thereto, thus, eliminating the need to fasten the installation clip devices directly to the structural member by using nails, glue or staples.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

We claim:

1. An installation clip device adapted for use with a first electrical cable that is mounted along a structural member so that at least one second electrical cable can be mounted therealong, comprising:

(a) a base member adapted to receive said first electrical cable whereby said base member becomes fastened directly to said first electrical cable and thereby indirectly secured to said structural member; and (b) a clip structure disposed on said base member and operative to receive and retain said second electrical cable whereby said second electrical cable is indirectly secured along said structural member, said clip structure having a first and a second retaining arm, each of said first and second retaining arms extending outwardly from said base member and terminating in a respective first and second distal end portion, said first and second retaining arms oriented in an opposed, spaced-apart relationship to define a clip channel therebetween with the clip channel sized and adapted to receive said second electrical cable so that said first and second retaining arms are operative to retain said second electrical cable oriented within the clip channel along a clip channel axis thereof.

2. An installation clip device according to claim 1 wherein said first and second retaining arms are symmetrical in configuration.

3. An installation clip device according to claim 1 wherein said first and second retaining arms are movable between a normally closed condition wherein said first and second distal end portions are located proximately to one another and an opened condition wherein said first and second distal end portions are separated sufficiently so that said second electrical cable can be inserted into the clip channel.

4. An installation clip device according to claim 3 wherein said first and second retaining arms are resiliently biased into the closed condition.

5. An installation clip device according to claim 4 wherein said base member and said first and second retaining arms are constructed as a unitary piece of resilient material.

6. An installation clip device according to claim 5 wherein said resilient material is acetal plastic.

7. An installation clip device according to claim 1 wherein each of said first and second retaining arms having an inner arm surface facing the clip channel and including a plurality of ridges disposed on the inner arm surfaces, said ridges oriented parallel to the clip channel axis.

8. An installation clip device according to claim 1 wherein said first and second retaining arms are sized and configured so that the clip channel can receive a plurality of said second electrical cables.

9. An installation clip device adapted for use with a first electrical cable that is mounted along a structural member so that at least one second electrical cable can be mounted therealong comprising:

(a) a base member adapted to receive said first electrical cable whereby said member becomes fastened directly to said first electrical cable and thereby indirectly secured to said structural member; and (b) a clip structure disposed on said base member and operative to receive and retain said second electrical cable whereby said second electrical cable is indirectly secured along said structural member, said clip structure including first and second retaining arms oriented in opposed spaced-apart relationship to define a clip channel therebetween, each of said first and second retaining arms including a centrally located flange, said flanges projecting into the clip channel in an orientation substantially parallel to said base member and in opposed relation to one another thereby to separate the clip channel into a first clip channel region proximate to said base member and a second clip channel region, each of said first and second clip channel regions sized to receive at least one of said second electrical cables.

10. An installation clip device according to claim 9 including a spacer disposed within the clip channel and operative to separate said first clip channel region into a pair of subregions whereby each of said subregions is sized to receive one of said second electrical cables.

11. An installation clip device according to claim 10 wherein each of said first and second retaining arms has an inner arm surface facing the clip channel, said spacer having a pair of spacer surfaces facially opposing a respective inner arm surface in a substantially parallel relationship therewith.

12. An installation clip device according to claim 1 wherein said base member includes a lower jaw element adapted to extend transversely of said first electrical cable between said structural member and said first electrical cable when said base member is fastened thereto and an upper jaw element spaced from said lower jaw element to define a base channel therebetween, said upper jaw adapted to extend transversely of said first electrical cable when said base member is fastened thereto with said first electrical cable received in the base channel along a longitudinally extending base channel axis.

13. An installation clip device according to claim 12 wherein said lower jaw element terminates in a free edge so that a mouth opening into the base channel is provided between said upper jaw element and said free edge with the mouth opening being located laterally of said base member.

14. An installation clip device according to claim 12 including a catch disposed on one of said first and said second jaw elements and extending into the base channel, said catch operative to engage and retain said first electrical cable within the base channel.

15. An installation clip device according to claim 14 including a plurality of teeth disposed on the other of said first and second jaw elements, said teeth extending into the base channel.

16. A installation clip device adapted for use with a first electrical cable that is secured in a longitudinal direction along a structural member so that at least one second electrical cable can be mounted therealong, comprising:

(a) a base member adapted to be fastened to said first electrical cable and including a lower jaw element adapted to be positioned between said structure member and said first electrical cable when said base member is fastened thereto and including an upper jaw element spaced from said lower jaw element to define a base channel therebetween with the base channel operative to receive said first electrical cable oriented along a longitudinally extending base channel axis thereof whereby said base member may be fastened to said first electrical cable by said first and second jaw elements;

(b) a first retaining arm projecting upwardly from said upper jaw element and terminating in a first free end; and (c) a second retaining arm projecting upwardly from said upper jaw element in a spaced-apart, opposed relationship to said first retaining arm and terminating in a second free end, said first and second retaining arms forming a clip structure having a clip channel that has a clip channel axis extending in the longitudinal direction, the clip channel sized and adapted to receive said second electrical cable such that said first and second retaining arms are operative to retain and position said second electrical cable above said first electrical cable.

17. An installation clip device according to claim 16 wherein said lower and upper jaw elements are joined at respective first lateral edges thereof so that said base member has a substantially U-shaped configuration with said lower jaw element terminating in a free second lateral edge so that a laterally-located, longitudinally-extending mouth opening is formed between said second lateral edge and said upper jaw element so that said base member can be transversely engaged onto said first electrical cable.

18. An installation clip device according to claim 17 wherein the mouth opening is convergent in a direction towards said base channel.

19. An installation clip device according to claim 17 including a catch disposed on one of said lower and upper jaws and operative to contact and retain said first electrical cable within the base channel.

20. An installation clip device according to claim 19 including a plurality of longitudinally extending rib teeth disposed on one of said upper and lower jaw elements, said rib teeth projecting into the base channel.

21. An installation clip device according to claim 16 wherein said first and second retaining arms are symmetrical in configuration.

22. An installation clip device according to claim 16 wherein said first and second retaining arms are movable between a normally closed condition wherein said first and second free ends are located proximately to one another and an opened condition wherein said first and second free ends are separated sufficiently so that said second electrical cable can be inserted into the clip channel.

23. An installation clip device according to claim 22 wherein said first and second retaining arms are resiliently biased into the closed condition.

24. An installation clip device according to claim 22 including a shoulder disposed on each of said first and second free ends in an opposed relationship to one another to define an inlet into the clip channel whereby said second electrical cable can be inserted into the clip channel.

25. An installation clip device according to claim 24 including a lip disposed on each said shoulder exteriorly of the clip channel in a manner to form a substantially V-shaped opening converging toward the inlet so that said second electrical cable can be pressed into the V-shaped opening thereby causing said lips to exert a force operative to spread said first and second retaining arms from the closed condition and to the opened condition thereby allowing said second electrical cable to pass through and into the clip channel.

26. An installation clip device according to claim 23 wherein said base member and said first and second retaining arms are constructed as a unitary piece of resilient plastic material.

27. An installation clip device adapted for use with a first electrical cable that is mounted along a structural member so that at least one second electrical cable can be mounted therealong, comprising:

(a) a base member adapted to receive said first electrical cable whereby said base member becomes fastened directly to said first electrical cable and thereby indirectly secured to said structural member;

(b) a clip structure disposed on said base member and operative to receive and retain said second electrical cable whereby said second electrical cable is indirectly secured along said structural member, said clip structure including first and second retaining arms oriented in opposed, spaced-apart relationship to define a clip channel therebetween; and (c) a shoulder disposed on first and second distal end portions respectively of said first and second retaining arms in an opposed relationship to one another to define an inlet into the clip channel whereby said second electrical cable can be inserted into the clip channel through the inlet; and (d) a lip disposed on each said shoulder exteriorly of the clip channel in a manner to form a substantially V-shaped opening converging toward the inlet so that said second electrical cable can be pressed into the V-shaped opening thereby causing said lips to exert a force operative to spread said first and second retaining arms from a closed condition and to an opened condition thereby allowing said second electrical cable to pass through and into the clip channel.

28. An installation clip device according to claim 1 including an upper and lower portion, said upper and lower portions first converging toward one another to a location approximately midway on the longitudinal edge of said clip device at a width smaller than that of said base member and then substantially parallel to one another from said location to said first and second distal end portions.

* * * * *